(12) United States Patent
Furuya et al.

(10) Patent No.: US 7,353,922 B2
(45) Date of Patent: Apr. 8, 2008

(54) AIR DAMPER

(75) Inventors: Takahiro Furuya, Wako (JP); Yousuke Yanagita, Utsunomiya (JP)

(73) Assignees: Nifco Inc., Yokohama-Shi (JP); Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 11/178,388

(22) Filed: Jul. 12, 2005

(65) Prior Publication Data

US 2006/0011431 A1  Jan. 19, 2006

(30) Foreign Application Priority Data

Jul. 14, 2004  (JP) .............................. 2004-207078

(51) Int. Cl.
*F16F 9/48* (2006.01)
(52) U.S. Cl. ................. 188/284; 188/322.15; 267/120; 267/124
(58) Field of Classification Search ................ 188/284, 188/322.15, 266.1, 281, 317, 322.18, 322.32; 267/120, 124; 16/84, 66; 297/344.19
See application file for complete search history.

(56) References Cited

U.S. PATENT DOCUMENTS

| | | | | |
|---|---|---|---|---|
| 3,040,712 A | * | 6/1962 | Harrah | ........................ 91/394 |
| 3,625,320 A | * | 12/1971 | Doetsch et al. | ............. 188/269 |
| 4,045,008 A | * | 8/1977 | Bauer | ......................... 267/120 |
| 4,110,868 A | * | 9/1978 | Imazaike | ........................ 16/84 |
| 4,166,612 A | | 9/1979 | Freitag et al. | |
| 4,323,224 A | * | 4/1982 | Freitag et al. | ........... 267/64.12 |
| 4,500,075 A | | 2/1985 | Tsuchiya et al. | |
| 4,741,518 A | | 5/1988 | Wallis | |
| 5,131,512 A | * | 7/1992 | Steinhilber et al. | .... 188/322.19 |
| 5,275,387 A | * | 1/1994 | Cotter et al. | ............. 267/64.11 |
| 2001/0007297 A1 | | 7/2001 | Gramb | |

FOREIGN PATENT DOCUMENTS

| | | |
|---|---|---|
| JP | H02-129424 | 5/1990 |
| JP | 08-105482 | 4/1996 |
| JP | 2002-005213 | 1/2002 |
| JP | 2002-070910 | 3/2002 |
| JP | 2002-146861 | 5/2002 |

* cited by examiner

*Primary Examiner*—Robert A. Siconolfi
*Assistant Examiner*—Mariano Sy
(74) *Attorney, Agent, or Firm*—Manabu Kanesaka

(57) ABSTRACT

An air damper includes a cylinder having a bottom, a piston received inside the cylinder to move freely back and forth coaxially, and an orifice provided in the piston. The piston is formed of a synthetic resin, and has a piston rod extending toward a side of the cylinder opposite to the bottom, and a recess portion provided on a portion facing the bottom in order to prevent sink or the like during molding of the piston. A protruding portion is provided on the bottom of the cylinder to protrude into the recess portion when the piston is fully moved into the cylinder.

7 Claims, 4 Drawing Sheets

AIR DAMPER

BACKGROUND OF THE INVENTION AND RELATED ART STATEMENT

The present invention relates to an air damper, and in particular, relates to an air damper for generating a damping force when a piston moves in one direction.

Conventionally, an air damper is used, for example, in an automobile glove compartment in order to obtain high quality when a cover thereof opens. Such an air damper has a cylinder having a cylindrical shape with a bottom, and a piston disposed inside the cylinder to move freely back and forth coaxially. A piston rod which is integrally formed with the piston projects toward a side opposite to the bottom part of the cylinder.

Patent Document 1: Japanese Patent Publication (Kokai) No. 08-105482

In the air damper described above, a cylinder opening in a projecting direction of the piston rod is closed with a cap. The piston divides the cylinder into two air chambers between the cylinder bottom and the cap, and the piston is provided with an orifice and an O-ring. A recess portion and a groove are formed for allowing the O-ring to move in an axial direction of the piston. When a cover opens and the O-ring moves, the groove is closed and air moves between the two chambers via the orifice. When the cover is closed and the O-ring moves, air moves between the two chambers via the groove. Accordingly, it is possible to provide an air damper in which damper effect is obtained through the orifice when the cover opens, and resistance becomes small due to air passing through the groove when the cover is closed.

In the air damper having the structure described above, a thickness of the piston in the axial direction (portion for moving the O-ring) becomes large to a certain extent. When the piston is molded using a synthetic resin material, a recess portion is provided on an end surface of the piston in order to prevent sink or deformation of a thick part. In this case, air pocket is formed in the recess portion between the bottom of the cylinder and the end surface of the piston, and air inside the pocket temporarily expands when the cover opens. Accordingly, there may be a damper inactive zone (idling interval, idling distance), in which air resistance is not generated, and buffering force or damping force is not generated upon opening the cover.

The piston may be formed in a solid shape without the recess portion. In this case, sink or deformation may occur, thereby making it difficult to control a size and a shape.

In view of the problems described above, an object of the present invention is to provide an air damper with a piston made of a synthetic resin, in which a damper inactive zone due to an air pocket is eliminated while preventing sink or deformation of the piston.

Further objects and advantages of the invention will be apparent from the following description of the invention.

SUMMARY OF THE INVENTION

In order to attain the objects described above, according to the present invention, an air damper comprises a cylinder having a cylindrical shape with a bottom, a piston received inside the cylinder to move freely back and forth coaxially, and an orifice provided in the piston. The piston is formed of a synthetic resin, and has a piston rod extending toward a side of the cylinder opposite to the bottom, and a recess portion provided in a side facing the bottom in order to prevent sink or the like during molding the piston. A protruding portion is provided on the bottom of the cylinder, and protrudes into the recess portion when the piston moves into the cylinder to a maximum extent.

The protruding portion is preferably formed in an arc or circular rib shape extending coaxially with an axis of the cylinder. Alternatively, the protruding portion is preferably formed in plural arc or circular rib shapes extending on plural concentric circles with respect to the axis of the cylinder. The protruding portion may be formed in a shape corresponding to that of the recess portion.

In the present invention, the recess portion is provided on the side opposite to the piston rod in order to prevent sink in the piston made of a synthetic resin. The protruding portion is provided on the bottom of the cylinder, and protrudes into the recess portion when the piston moves into the cylinder to a maximum extent. In this state, air is not accumulated in the recess portion to a large extent. Accordingly, it is possible to reduce an idling distance (interval in which damper effect is not obtained) due to expansion of the air accumulated in the recess portion when the piston starts to move from the maximally plunged state. Therefore, the damper effect of the air damper can be obtained over substantially an entire stroke of the piston.

In the invention, the protruding portion may be formed in an arc or circular rib shape extending coaxially with the axis of the cylinder. Accordingly, the piston can respond to a case of rotating freely around the axis. The protruding portion may be formed in plural arc or circular rib shapes extending on plural concentric circles with respect to the axis of the cylinder. Accordingly, the piston can respond to a case of rotating freely around the axis. In addition, by providing plural ribs on the bottom part of the cylinder, the strength can be suitably increased.

In the invention, the protruding portion may be formed in a shape corresponding to that of the recess portion. Accordingly, it is possible to reduce a gap in which air is accumulated in a state in which the protruding portion moves into the recess portion, thereby reducing the idling distance.

DETAILED DESCRIPTION OF PREFERRED EMBODIMENTS

Figure 1:
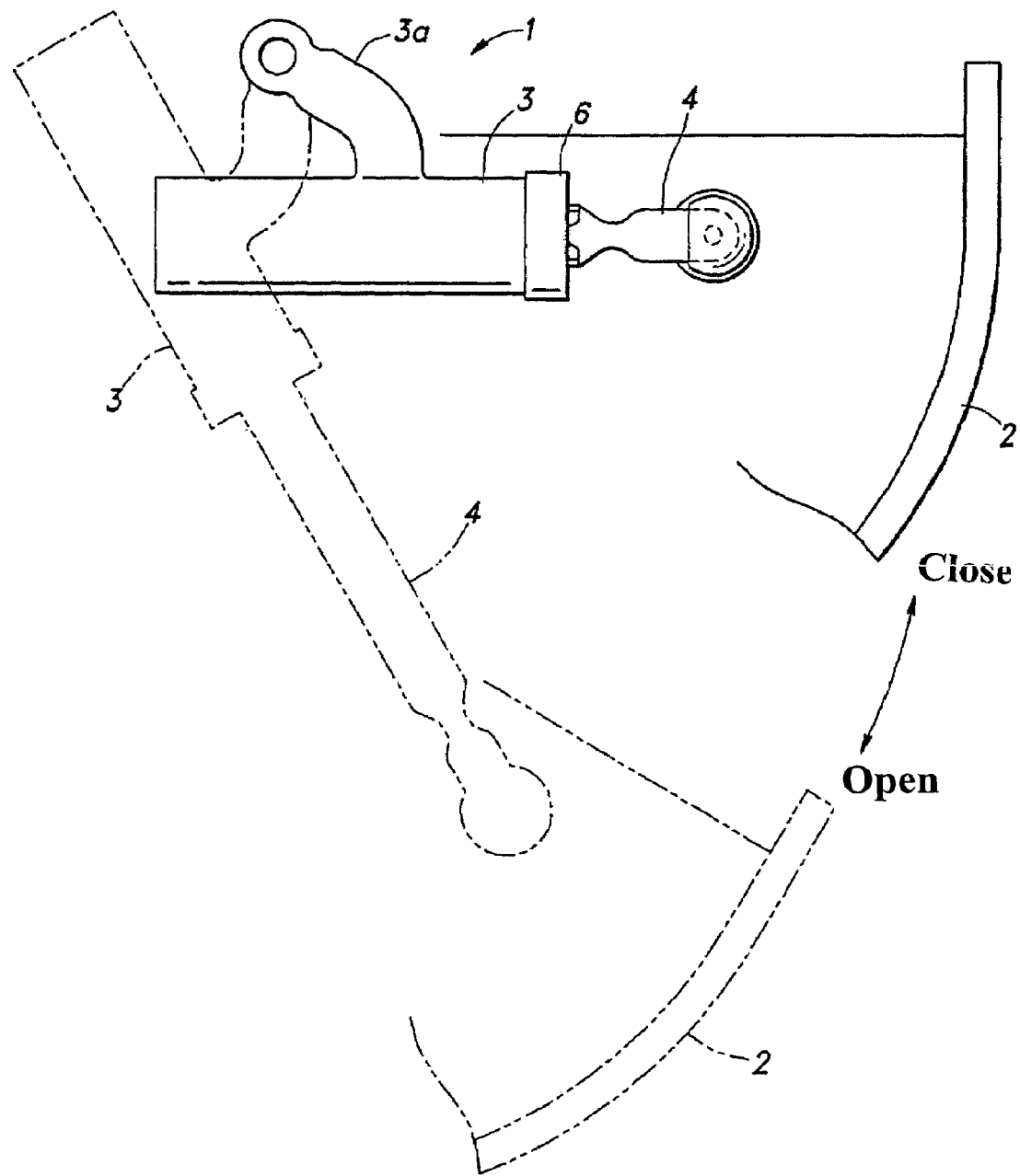
FIG. 1 is a side view showing an essential part of an air damper used in an automobile glove compartment according to an embodiment of the present invention.

Hereunder, embodiments of the present invention will be explained with reference to the accompanying drawings. FIG. 1 is a side view showing essential components of an air damper 1 for an automobile glove compartment 2 according to an embodiment of the present invention. A cylinder 3 of the air damper 1 is pivotally supported by means of an integrally formed arm 3a on a dashboard (not shown). A front end part (protruding end part) of a piston rod 4 protruding out from the cylinder 3 is linked in a suitable place of the glove compartment 2. The piston rod 4 is plunged into the cylinder 3 in a fully closed state of the glove compartment 2 shown by solid lines in the drawing. The piston rod 4 is protruding out to the longest or near that in the fully open state shown by phantom lines in the drawing.

The air damper 1 is used for opening and closing the glove compartment 2. When the glove compartment 2 opens by its own weight, it opens gently by the damper effect, and when closing by a hand, it is closed lightly without resistance by the air damper 1. A structure of the air damper 1 for that purpose is not anything special.

Figure 2:
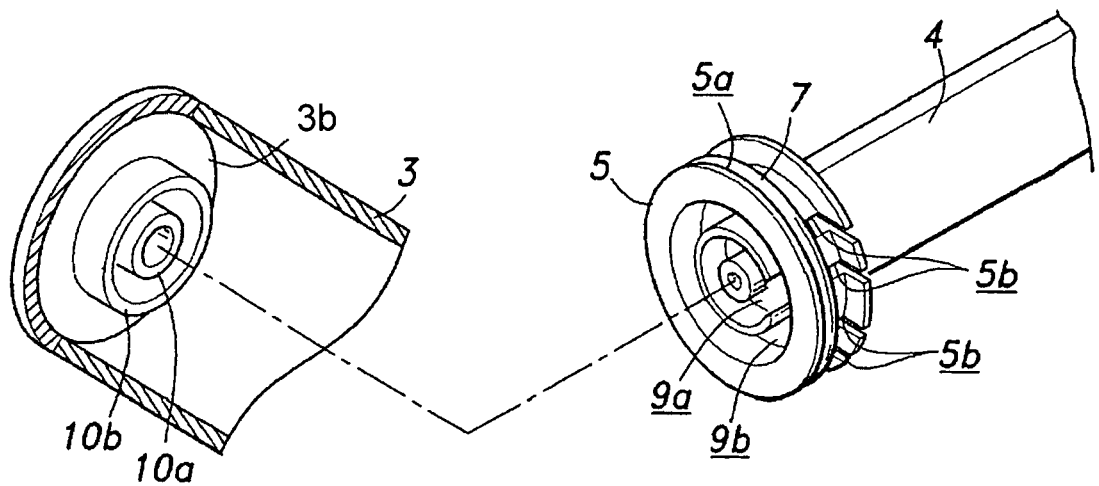
FIG. 2 is an exploded and enlarged perspective view showing the essential part of the air damper.
Figure 3:
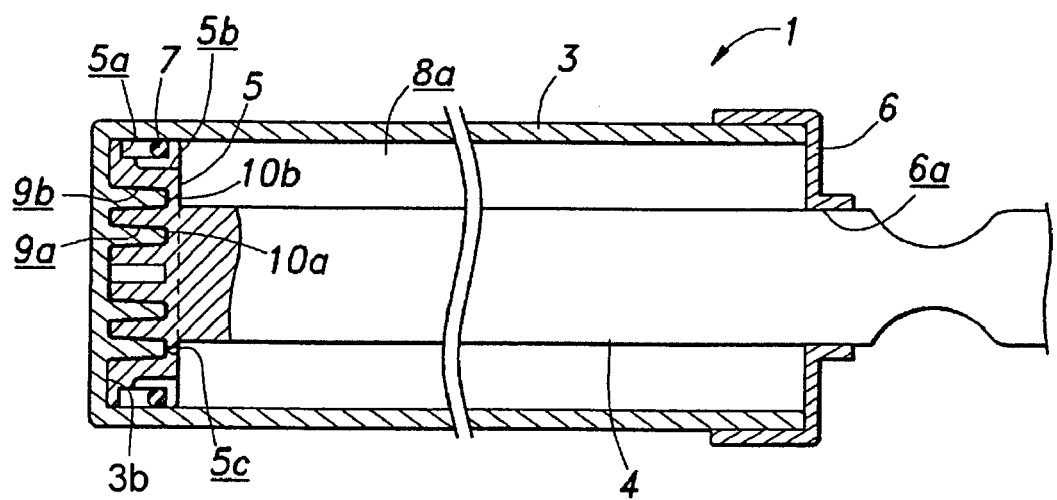
FIG. 3 is a side sectional view showing the air damper in a fully closed state.

For example as shown in FIG. 2 and FIG. 3, the air damper 1 comprises the cylinder 3 having a cylindrical shape with a bottom, a piston 5 received inside the cylinder 3 to move freely back and forth, and the piston rod 4 which extends out coaxially on a side opposite to a bottom 3b of the cylinder 3. A flat cap 6 having a cylindrical shape with a bottom is attached on the open end of the cylinder 3. The piston rod 4 extends through that cap 6, and protrudes out coaxially to the outside of the cylinder 3. Also, the piston rod 4 is supported to slide freely by an opening 6a provided in the center part of the end plate of the cap 6.

The piston 5 is formed in a disk shape having a certain width in the axial direction. A circumferential groove 5a having a flat U-shape in a cross sectional shape is formed over an entire outer perimeter of the piston 5, and an O-ring 7 is fitted in the circumferential groove 5a. A width of the circumferential groove 5a (length in the axial direction of the piston 5) is a length by which the O-ring 7 can move in its width direction.

The piston 5 is provided with axial grooves 5b at an end portion thereof on a side of the piston rod 4. The axial grooves 5b are opened and reach near a mid-point in a width direction of the circumferential groove 5a. The axial grooves 5b are provided such that, in a state that the O-ring 7 is positioned in the circumferential groove 5a where the piston rod protrudes outwardly, an air chamber 8a partitioned by the piston 5 on the side opposite to the bottom 3b communicates with a part of the circumferential grooves 5a not closed by the O-ring 7. In that communicating state, the air chamber 8a communicates with an air chamber 8b on the side of the bottom of the piston 5.

Figure 4:
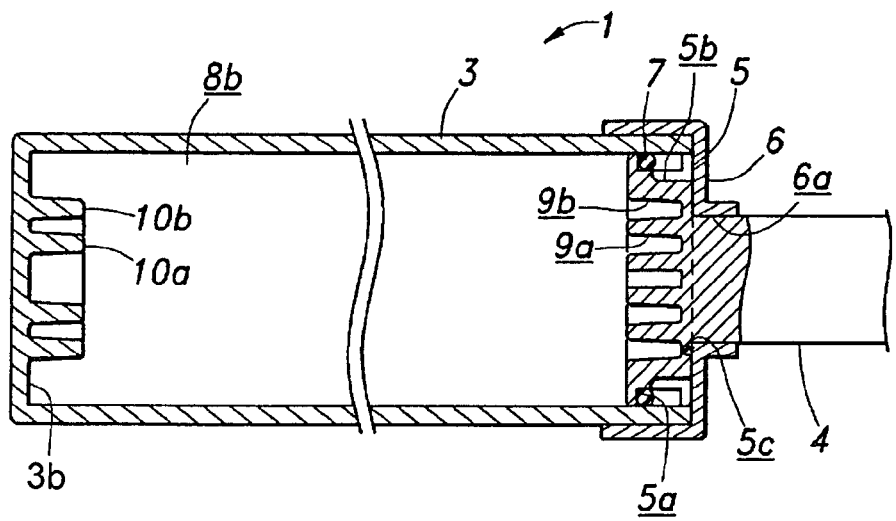
FIG. 4 is a side sectional view showing the air damper in a state of beginning to open.

When the piston 5 is displaced in the direction indicated by the arrow A in FIG. 4, in which the piston rod 4 protrudes outwardly, because the O-ring 7 slides on the inner perimeter surface of the cylinder 3, it moves inside the circumferential groove 5a toward the side of the bottom 3b as shown in FIG. 4. Accordingly, when the O-ring 7 is positioned between the air chamber 8b on the side of the bottom 3b and the axial grooves 5b, the communicating state is blocked.

An orifice 5c passing through in the axial direction is provided in the piston 5 in a suitable place. Accordingly, in the blocked state by the O-ring 7 during displacement of the piston 5 in the arrow A direction, air flows from the air chamber 8a to the air chamber 8b through the orifice 5c, whereby the air damper effect is exhibited. When the piston 5 is displaced in the arrow A direction, the piston rod 4 protrudes from the cylinder 3, that is, the glove compartment 2 is opened. Therefore, when opening the glove compartment 2, a gentle opening action by air damper can be accomplished.

Figure 5:
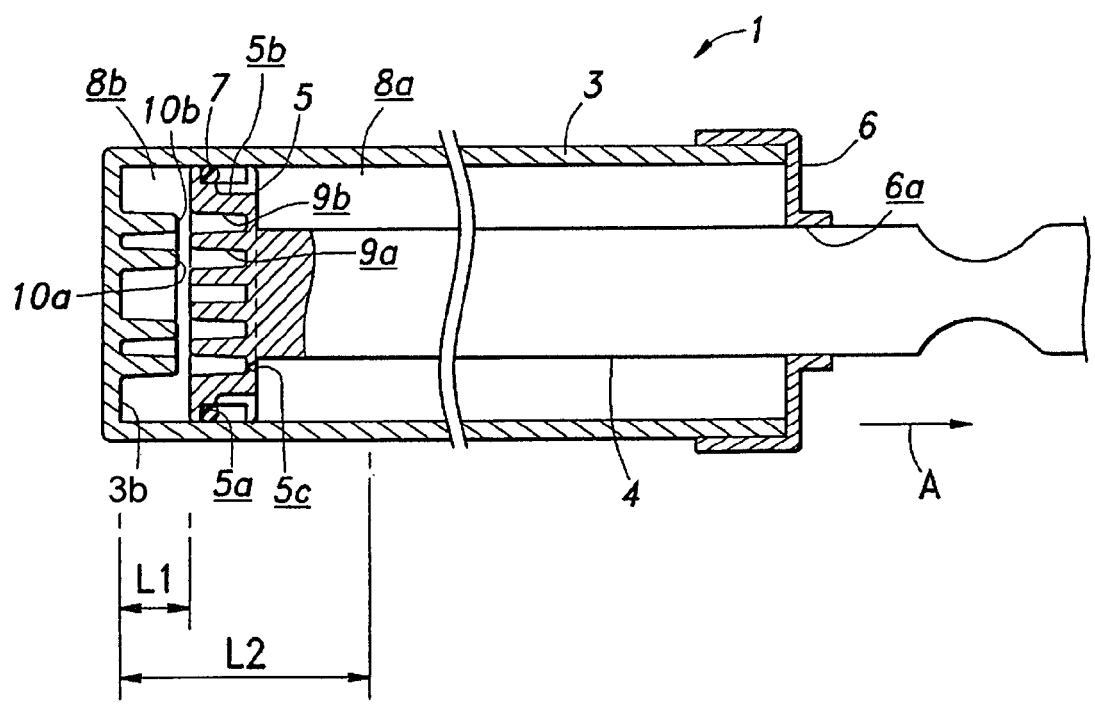
FIG. 5 is a side sectional view showing the air damper in the fully open state.

In the fully open state of the glove compartment 2, the air damper 1 becomes in a state in which the piston rod 4 is maximally protruding as shown in FIG. 5. It is not necessary for the piston 5 to contact the cap 6 when the glove compartment 2 is fully open, and it also may become in the maximally protruding state before that.

Figure 6:
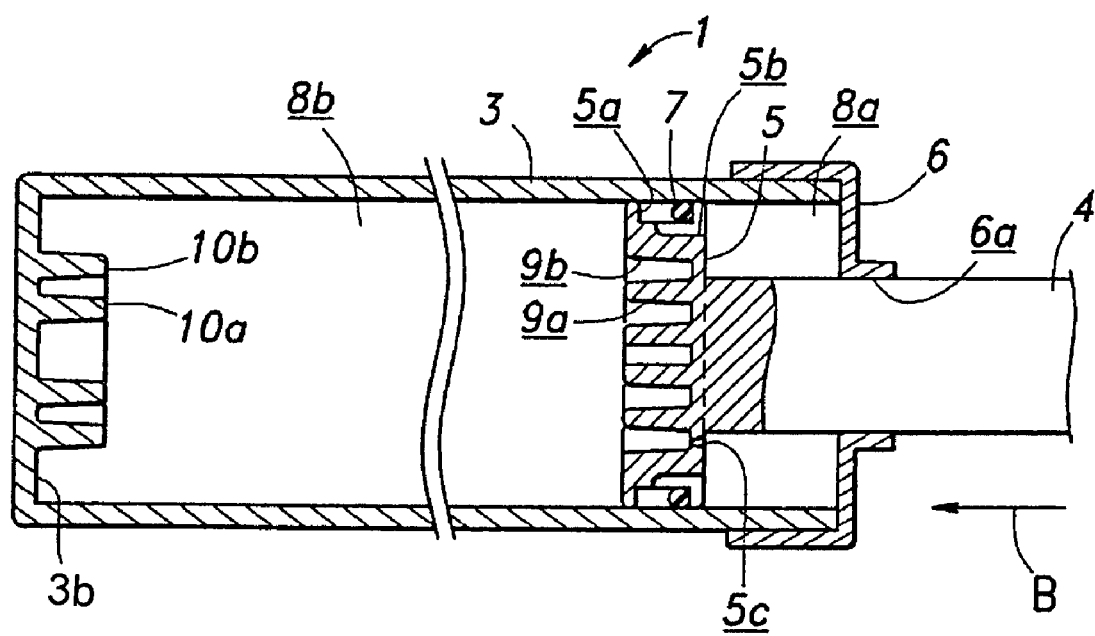
FIG. 6 is a side sectional view showing the air damper in a state of beginning to close from the fully open state.

When closing the glove compartment 2, the piston rod 4 is displaced toward the direction of plunging into the cylinder 3 as shown by an arrow B in FIG. 6. The O-ring 7 slides on the inner perimeter surface of the cylinder 3 and moves inside the circumferential groove 5a toward the side of the piston rod 4. Accordingly, the two air chambers 8a and 8b partitioned by the piston 5 become in a communicating state by means of the axial grooves 5b. The axial grooves 5b are provided at plural locations to increase a flow channel area. Accordingly, when the piston rod 4 is moving in the plunging direction, the resistance of the air flowing between the two air chambers 8a and 8b is reduced, thereby eliminating the damper effect.

When the glove compartment 2 opens by its own weight, the opening action can be accomplished gently by the air damper effect. In addition, when closing the glove compartment 2, it can be closed with light force in a manner such that air resistance is not caused by making the flow of air smooth, and the product quality in opening and closing of the glove compartment 2 can be increased.

Each component of the damper 1 can be made as a molded product from a synthetic resin material, thereby making the damper lightweight and reducing cost. In the case of resin molding, a solid thick part has a cutout portion so that sink or deformation does not occur. In the air damper 1, the piston 5 has a certain thickness in the axial direction. Accordingly, as shown in FIG. 2, dual annular recess portions 9a and 9b are provided in the bottom 3b of the piston 5 as a cutout portion.

An annular rib spacing the two annular recess portions 9a and 9b is formed in a C shape in the embodiment. This cutout portion is for avoiding interference with the orifice 5c, and the annular rib may be a shape continuing over the entire perimeter depending on a position of the orifice 5c. The orifice 5c shown in FIG. 3 to FIG. 6 is just an example, and it does not specifically show its position.

Annular walls 10a and 10b corresponding to the annular recess portions 9a and 9b are integrally provided on the bottom of the cylinder 3. When the piston 5 contacts the bottom 3b, air can accumulate inside the annular recess portions 9a and 9b without the annular walls 10a and 10b. When the annular walls 10a and 10b are provided and protrude inside the annular recess portions 9a and 9b, the gap inside the annular recess portions 9a and 9b are virtually eliminated.

When the piston 5 starts to be displaced in the protruding direction of the piston rod 4 from the maximally plunged state shown in FIG. 3, as shown in FIG. 4, an idling distance L1 due to expansion of air accumulated in the cutout parts of the piston becomes shorter than an idling distance L2 in a case that there are no annular walls 10a and 10b. Accordingly, the damper effect can be made to function effectively in the entire stroke region of the air damper 1.

When an air damper is used in a glove compartment 2 as in the present embodiment, if the idling distance is long at the start of opening, even if a degree of opening is small, it may open suddenly and be startling. When the idling distance is short or even virtually nonexistent, it opens gently from the start of opening, thereby preventing such startling and creating a sense of high quality.

In the embodiment, the dual annular walls 10a and 10b are provided and function as ribs. Accordingly, it is possible to provide the bottom 3b with rigidity as compared with one wall. Also, it is made in a shape in which they form concentric circles with respect to the axis. Accordingly, it is effective also when it is used in a manner such that the piston 5 can rotate around the axis.

The shape of the protruding portions (annular walls 10a and 10b) provided on the bottom 3b is an annular wall shape. They should be matched to the cutout shape on the side of the piston 5, and are not limited to the annular walls. Also, the outer surface of the bottom 3b of the cylinder 3 may be recessed. The protruding shape on the side of the bottom 3b, as in the embodiment, is effective from a relationship between the parting surface and the core when molding the cylinder 3 having a cylindrical shape with a base.

The air damper according to the present invention has the effect of eliminating the idling distance due to air accumulation in cutouts provided in the piston, and it is useful as an air damper that can be applied to various kinds of opening-and-closing bodies.

The disclosure of Japanese Patent Application No. 2004-207078, filed on Jul. 14, 2004, is incorporated in the application.

While the invention has been explained with reference to the specific embodiments of the invention, the explanation is illustrative and the invention is limited only by the appended claims.

What is claimed is:

1. An air damper, comprising:
 a cylinder having a bottom portion,
 a piston disposed in the cylinder to move back and forth therein, and having a piston rod extending toward a side opposite to the bottom portion, and a recess portion provided in an end portion of the piston facing the bottom portion, and
 a protruding portion provided on the bottom portion, said protruding portion having a plurality of arc ribs or circular ribs formed concentrically relative to an axis of the cylinder and a shape corresponding to the recess portion so that the protruding portion is substantially completely located in the recess portion when the piston is fully inserted into the cylinder.

2. An air damper according to claim 1, wherein said piston is formed of a synthetic resin material, and the recess portion is provided for preventing sink.

3. An air damper according to claim 1, wherein said piston has a circumferential groove at a side portion thereof, and at least one axial groove communicating with the circumferential groove and a side of the piston rod.

4. An air damper according to claim 3, further comprising an O-ring disposed in the circumferential groove so that the O-ring can slide inside the circumferential groove upon movement of the piston.

5. An air damper according to claim 4, wherein said piston further includes an orifice.

6. An air damper according to claim 1, wherein said cylinder including the bottom portion and the protruding portion is integrally formed together by one material.

7. An air damper according to claim 6, wherein said piston has an annular rib, and two recesses which surround the annular rib and form said recess portion, said piston with the annular rib being integrally formed of a synthetic resin material.

* * * * *